No. 779,751. PATENTED JAN. 10, 1905.
H. M. WAITT.
WASHER.
APPLICATION FILED APR. 23, 1904.
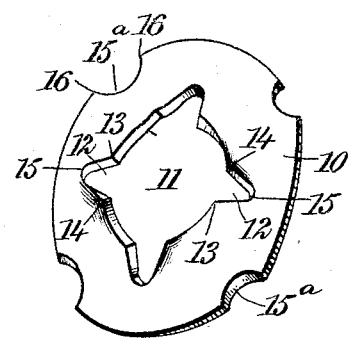
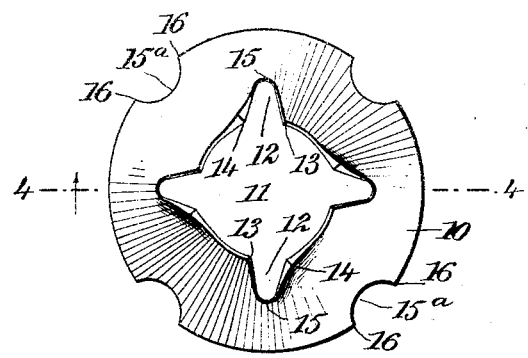
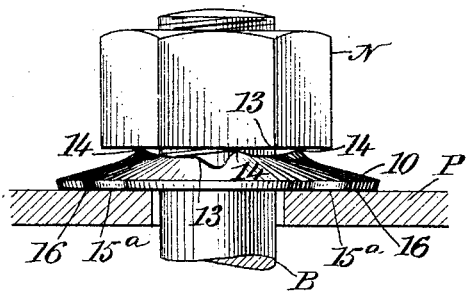
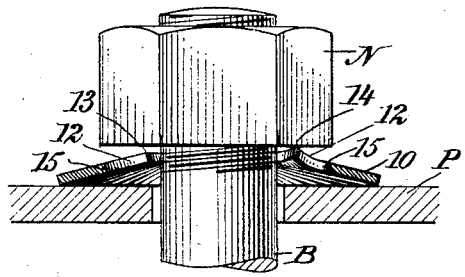
WITNESSES:
C. Munker
S. H. Cobb
INVENTOR
Henry M. Waitt
BY
ATTORNEYS No. 779,751.

Patented January 10, 1905.

UNITED STATES PATENT OFFICE.

HENRY M. WAITT, OF CHICAGO, ILLINOIS.

WASHER.

SPECIFICATION forming part of Letters Patent No. 779,751, dated January 10, 1905.

Application filed April 23, 1904. Serial No. 204,534.

*To all whom it may concern:*

Be it known that I, HENRY M. WAITT, a citizen of the United States, and a resident of Chicago, in the county of Cook and State of Illinois, have invented a new and Improved Washer, of which the following is a full, clear, and exact description.

My invention relates to washers, and particularly to those adapted for use in connection with railroad-track bolts and in similar situations where it is important to provide against the nut slackening off under shocks or vibrations. Its principal objects lie in the provision of a simple and secure device of this character.

It consists in the various features hereinafter described and more particularly claimed.

Reference is to be had to the accompanying drawings, forming a part of this specification, in which similar characters of reference indicate corresponding parts in all the figures.

Figure 1 is a perspective view of one form of my improved washer. Fig. 2 is a top plan view thereof. Fig. 3 is a side elevation of the washer applied to a bolt and coacting elements; and Fig. 4 is a similar view showing the washer in vertical section, this being taken on the line 4 4 of Fig. 2.

10 designates a ring constituting the body of the washer, this being conveniently punched from some such sheet metal as steel. This ring is of generally concave or dished form, which contour may be produced in punching out, and the ring-opening 11 is situated at substantially the center of the body. Radiating from this opening are slots 12, here shown as four in number and symmetrically arranged, in the present instance lying at an angle of ninety degrees apart. If the metal is one which has a perceptible grain, it is preferable to locate these slots at an angle of about forty-five degrees with the grain to insure maximum strength. At the juncture of each side of the slot with the ring-opening are opposite corners 13 and 14, and at the opposite or outer end of each slot the sides merge into a semicircular or curved portion 15. The corner 14 is somewhat raised or lies at a greater distance from the general plane of the ring than the corner 13, furnishing a sharp engaging projection. At the periphery of the ring are depressions 15ª, preferably of curved or parti-circular form and symmetrically arranged, lying between the slots 12 and also separated by angles of ninety degrees. The intersection of the ends of the depressions 15ª with the periphery of the ring form corners 16, which also serve as engaging projections.

In use the washer is placed about such a securing device as a bolt B, with its peripheral edge in contact with some such member as a plate P. The nut N may now be applied to the bolt and turned down into contact with the projections 14, and as the direction of rotation is opposite to the extension of these projections the nut will ride smoothly over them without material resistance. In thus setting up the nut the washer is somewhat flattened out under the pressure and then exerts its tension to both force the projections 14 and 16 into the natural depressions or surface grain of the coacting elements, preventing the reverse rotation of both the washer and nut, the action of the raised corners 14 being somewhat in the nature of spring-detents or cantalivers.

It will be seen that as a result of the symmetrical arrangement of the projections about the ring there will be no transverse strain upon the bolt, but that instead the resultant pressure will be in the direction of the axis, giving an evenly-distributed thrust upon the threads. The points of bearing of the raised corners 14 upon the nut will come inside the bead, which usually exists at the outer edge, thus avoiding the destruction of this even bearing by contact with a sensibly irregular surface. Even if there is some slight slackening off of the nut the expansion of the washer will enable it to follow, so that it cannot loosen rapidly. It should be noted that in both the slots 12 and the peripheral depressions 15ª there are no abrupt changes in the outline, but that the curved contour of the latter and the curved and gradually-merging ends of the former leave no corners from which cracks might start through the body of the washer under the strains upon it.

Having thus described my invention, I claim as new and desire to secure by Letters Patent—

A washer comprising a circular body provided with a central opening, said body having elongated slots extending from the opening and one corner of each slot being turned out beyond the other to form an engaging projection, and depressions situated at the outer circumference of the body between the slots and forming an engaging projection at each side of the depressions and at the opposite side of the washer from those furnished by the slots.

In testimony whereof I have signed my name to this specification in the presence of two subscribing witnesses.

HENRY M. WAITT.

Witnesses:
MOSES W. LITTLEFIELD,
CHARLES A. SAWYER.